Dec. 4, 1934.    F. WINKLER ET AL    1,982,774
MIRROR
Filed April 21, 1930
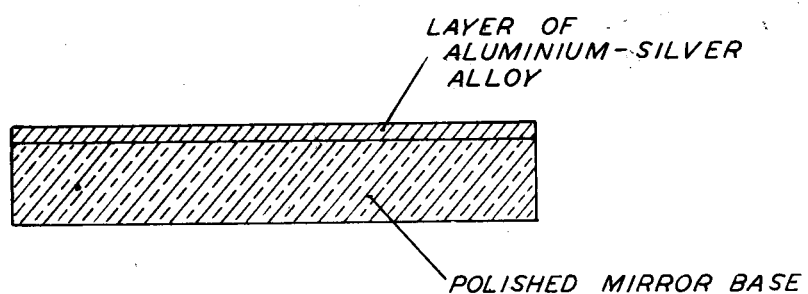
INVENTORS
FRITZ WINKLER
ERNST HOCHHEIM
FRIEDRICH BERGMANN.
BY Hauff-Harland
ATTORNEYS.

Patented Dec. 4, 1934

1,982,774

UNITED STATES PATENT OFFICE 1,982,774

MIRROR

Fritz Winkler, Ludwigshafen - on - the - Rhine, Ernst Hochheim, Heidelberg, and Friedrich Bergmann, Mannheim, Germany, assignors of I. G. Farbenindustrie Aktiengesellschaft, Frankfort-on-the-Main, Germany Application April 21, 1930, Serial No. 446,183
In Germany April 27, 1929

4 Claims. (Cl. 88—1)

The present invention relates to the production of optical mirrors having a high uniform reflection power for all wave lengths.

The quality of an optical mirror is determined by the coefficient of reflection of the material of the mirror, and for this purpose use is made of metals and metallic alloys the coefficient of reflection of which is high, but depends on the wave length of the light to be reflected. Thus silver for example which is the best reflecting metal in the visible part of the spectrum, shows a decrease of the coefficient of reflection from about 94 per cent in the red part to 85 per cent in the violet part of the spectrum to a minimum of the reflection coefficient of about 4 per cent in the region of the ultraviolet (wave length about 3200 Å).

For a good mirror material, especially for astronomical purposes, there is required, in addition to as high reflection power as possible, as great a uniformity thereof as possible over the whole range of the spectrum. In cases where hitherto a rather uniform reflection power has been obtained as for example in certain magnesium-aluminium alloys, there is a proportional decrease of the coefficient of reflection.

We have now found that optical mirrors having a high and uniform reflection power for all wave lengths are obtained by composing the reflecting layer of at least two metals which term is to be understood as comprising also metal alloys, the reflection power of one of the metals being low in a definite range of the spectrum and the said power of the other metal being high in the same range of the spectrum, so that the reflection powers of the metals amplify and supplement each other and the mirror shows a uniform reflection power for all wave lengths.

The mirrors may be produced on any base, for example, on metals, quartz, glass and the like, and may be produced in any known manner. A preferred method of producing the said mirrors consists in vaporizing the metals forming the mirror and condensing the metallic vapours on the polished base in a high vacuum, which is preferably below $10^{-4}$ millimetres of mercury. The metals may be deposited simultaneously or consecutively, and the different metals may be deposited by different methods. Thus, for example a silver coating may be produced by precipitating metallic silver from its solution and afterwards aluminum may be deposited by vaporization and condensation thereon. The metals may also be deposited on the base by cathodic atomization.

When producing the composite metallic mirror by vaporization of a mixture of metals of the said kind and condensation of the vapours on the mirror base in a high vacuum, it is to be kept in mind that the vapour formed has not the same composition as the melt, but the vapour of the metal having the lower boiling point predominates in the vapour phase and therefore prevails also in the condensate. Therefore the composition of the melt of the metals may vary within rather wide limits. Thus melts containing from about 8 to 90 per cent of aluminium and from about 92 to 10 per cent of silver, or melts containing about 90 per cent of aluminium and about 10 per cent of silicon may be used for the purpose of the present invention. Particularly good mirrors are obtained by condensing a mixture of metallic vapours produced by the vaporization of a melted mixture of silver and aluminium in the proportion of 92.2 per cent of silver and 7.8 per cent of aluminium on to the mirror base in a high vacuum of at the most $10^{-4}$ or even better of $10^{-5}$ millimetres of mercury.

In the same way combinations of silver with other metals which reflect well in the ultraviolet for example with silicon, nickel, magnesium-aluminium alloys containing 31 per cent of magnesium and 69 per cent of aluminium, can be produced.

Mirrors produced in accordance with this invention have a perfectly smooth external surface and a high reflection power which is uniform over the whole range of the spectrum. The durability of the aluminium-silver mirror produced as aforesaid is extremely high and this mirror after being acted upon for half an hour or thereabouts by the vapours of ammonium sulphide showed no change, whereas a silver mirror similarly acted upon would be completely corroded. Aluminium-silver mirrors on a mirror base of quartz are particularly durable. Such a mirror does not lose its excellent reflection power when exposed even for years to an atmosphere containing sulphuretted hydrogen. Glass having a low alkali content is also very suitable as a mirror base.

The adhering capacity of the mirror coatings on metallic substrata is quite considerably increased by keeping the polished metallic substrata hot during the deposition of the mirror coatings or by heating the mirrors after the application of the coatings. This process of keeping the metallic substrata hot or of heating the mirrors may be advantageously effected for example by means of electrical discharges in vacuo. These discharges may be caused to pass between special auxiliary electrodes or the mirror or mirrors themselves may be employed as electrodes.

In the accompanying drawing the figure represents a cross-section of a mirror embodying our invention. According to the figure a reflecting layer of an aluminum-silver alloy is deposited on a polished mirror base which preferably consists of quartz.

What we claim is:—

1. As a new article of manufacture, a mirror comprising a reflecting layer which consists of silver and aluminium and is deposited on a polished mirror base, said mirror having a high and uniform reflection power for all wave lengths.

2. As a new article of manufacture, a mirror comprising a reflecting layer which consists of silver and aluminium and is deposited on a polished vitreous mirror base, said mirror having a high and uniform reflection power for all wave lengths.

3. As a new article of manufacture, a mirror comprising a reflecting layer which consists of silver and aluminium and is deposited on a polished vitreous mirror base consisting of highly polished quartz, said mirror having a high and uniform reflection power for all wave lengths.

4. As a new article of manufacture, a mirror comprising a reflecting layer which consists of about 10 percent of silver and about 90 per cent of aluminium and is deposited on a polished mirror base, consisting of highly polished quartz, said mirror having a high and uniform reflection power for all wave lengths.

FRITZ WINKLER.
ERNST HOCHHEIM.
FRIEDRICH BERGMANN.